US012766486B2

(12) United States Patent
Jung et al.

(10) Patent No.: US 12,766,486 B2
(45) Date of Patent: Oct. 20, 2026

(54) CARBON DIOXIDE ABSORBENT COMPRISING IONIC LIQUID AND ALCOHOL SOLVENT, AND METHOD OF SEPARATING CARBON DIOXIDE USING THE SAME

(71) Applicant: SK Innovation Co., Ltd., Seoul (KR)

(72) Inventors: Ilgu Jung, Daejeon (KR); Lim Ok Pyun, Daejeon (KR); Byul Ha Na Min, Daejeon (KR); Junga Lee, Daejeon (KR); Jisu Jeong, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 19/021,736

(22) Filed: Jan. 15, 2025

(65) Prior Publication Data

US 2025/0153143 A1 May 15, 2025

Related U.S. Application Data

(62) Division of application No. 18/251,789, filed as application No. PCT/KR2022/008599 on Jun. 17, 2022, now Pat. No. 12,508,572.

(30) Foreign Application Priority Data

Jul. 15, 2021 (KR) ........................ 10-2021-0092626

(51) Int. Cl.

| | |
|---|---|
| ***B01J 20/34*** | (2006.01) |
| ***B01J 20/22*** | (2006.01) |
| ***B01J 20/28*** | (2006.01) |

(52) U.S. Cl.

CPC ........... *B01J 20/3425* (2013.01); *B01J 20/22* (2013.01); *B01J 20/28014* (2013.01); *B01J 20/345* (2013.01)

(58) Field of Classification Search

CPC .. B01J 20/3425; B01J 20/22; B01J 20/28014; B01J 20/345; B01J 20/3483;

(Continued)

(56) References Cited

FOREIGN PATENT DOCUMENTS

| | | |
|---|---|---|
| CN | 102827037 A | 12/2012 |
| CN | 108993098 A | 12/2018 |

(Continued)

OTHER PUBLICATIONS https://pubchem.ncbi.nlm.nih.gov/compound/Ethylene-Glycol (Year: 2004).*

(Continued)

*Primary Examiner* — Anthony J Zimmer
*Assistant Examiner* — Jaanzeb C Raja
(74) *Attorney, Agent, or Firm* — The Webb Law Firm

(57) ABSTRACT

Provided is a carbon dioxide absorbent including an ionic liquid including an imidazole-based anion and an aliphatic alcohol, and since an alcohol solvent included in the carbon dioxide absorbent according to one embodiment has low toxicity and a very high boiling point, the carbon dioxide absorbent has no problem of release into the atmosphere and consequent environmental pollution, and is chemically stable to significantly lower the possibility of release of decomposition products into the atmosphere. In addition, the carbon dioxide absorbent is also effective, since it may absorb carbon dioxide with a higher equivalent than an absorbent input equivalent, and has low regeneration energy so that carbon dioxide is easily desorbed.

10 Claims, 3 Drawing Sheets

(58) Field of Classification Search
CPC .... B01D 2252/202; B01D 2252/20484; B01D 2252/30; B01D 2252/504; B01D 2258/0283; B01D 53/1493; B01D 53/1475; B01D 53/1425; B01D 2252/2053; Y02C 20/40
See application file for complete search history.

(56) References Cited

FOREIGN PATENT DOCUMENTS

| | | | |
|---|---|---|---|
| CN | 112354330 | A | 2/2021 |
| KR | 20110080004 | A | 7/2011 |
| KR | 1020110099466 | A | 9/2011 |
| KR | 101122714 | B1 | 3/2012 |
| KR | 1020140014740 | A | 2/2014 |
| KR | 102082695 | B1 | 2/2020 |

OTHER PUBLICATIONS https://pubchem.ncbi.nlm.nih.gov/compound/Ethanolamine#section=Autoignition-Temperature (Year: 2004).*
https://elchemy.com/blogs/chemical-market/ethylene-glycol-vs-propylene-glycol-which-is-more-sustainable-for-industrial-cooling (Year: 2025).*
Cui et. al., "Efficient CO2 absorption by azolide-based deep eutectic solvents", 2019, Chem. Commun., 55, 1426-1429 (Year: 2019).*
Heldebrant et al., "CO2-Binding Organic Liquids, an Integrated Acid Gas Capture System", Energy Procedia, 2011, pp. 216-223, vol. 4.
Jiang et al., "Highly efficient and reversible CO2 capture by imidazolate-based ether-functionalized ionic liquids with a capture transforming process", Journal of the Taiwan Institute of Chemical Engineers, 2016, pp. 85-92, vol. 69.
Shannon et al., "Reactive and Reversible Ionic Liquids for CO2 Capture and Acid Gas Removal", Separation Science and Technology, 2012, pp. 178-188, vol. 47.
Wang et al., "Carbon Dioxide Capture by Superbase-Derived Protic Ionic Liquids", Angew. Chem. Int. Ed., 2010, pp. 5978-5981, vol. 49.
Wang et al., "Tuning the Basicity of Ionic Liquids for Equimolar CO2 Capture", Angew. Chem. Int. Ed., 2011, pp. 4918-4922, vol. 50.
Zhang et al., "CO2 Capture by Imidazolate-Based Ionic Liquids: Effect of Functionalized Cation and Dication", Industrial & Engineering Chemistry Research, 2013, pp. 6069-6075, vol. 52, No. 18.
Cui et al., "Efficient CO2 absorption by azolide-based deep eutectic solvents", 2019 Chem. Commun., 2019, pp. 1426-1429, vol. 55.
Shi et al., "Highly efficient synthesis of alkylidene cyclic carbonates from low concentration CO2 using hydroxyl and azolate dual functionalized ionic liquids", Royal Society of Chemistry, 2021, pp. 592-596, vol. 23.

* cited by examiner

CARBON DIOXIDE ABSORBENT COMPRISING IONIC LIQUID AND ALCOHOL SOLVENT, AND METHOD OF SEPARATING CARBON DIOXIDE USING THE SAME

CROSS REFERENCE TO RELATED APPLICATIONS

This application is a divisional of U.S. patent application Ser. No. 18/251,789, filed Jun. 17, 2022, which is the United States national phase of International Patent Application No. PCT/KR2022/008599 filed Jun. 17, 2022, and claims priority to Korean Patent Application No. 10-2021-0092626 filed Jul. 15, 2021, the disclosures of each of which are hereby incorporated by reference in their entireties.

BACKGROUND OF THE INVENTION

Field of the Invention

The present disclosure relates to a carbon dioxide absorbent comprising an ionic liquid and an alcohol solvent, and a method of separating carbon dioxide using the same.

Description of Related Art

Energy use is increasing worldwide due to the rapid progress in economic development and industrialization, and thus, the use of fossil fuels which are the main source of energy is also increasing. Global warming issues closely related to energy use are a global concern. Carbon dioxide ($CO_2$) which accounts for the highest proportion of the major greenhouse gases is mostly produced in the process of burning fossil fuels and converting them into energy.

Since the carbon dioxide produced as such is controllable, a technology to remove carbon dioxide is receiving great attention. Among the process of capturing carbon dioxide, a method to be applied to combustion exhaust gas largely comprises an absorption method, an adsorption method, a membrane separation method, and the like, depending on the separation characteristics. Among them, the most actively used method is an absorption method, and the absorption method is classified into a physical absorption method and a chemical absorption method.

A representative absorbent of the chemical absorption method comprises alkanolamine-based compounds such as monoethanolamine (MEA), diethanolamine (DEA), and N-methyldiethanolamine (MDEA). In particular, MEA belonging to primary amines is used as a 30 wt % aqueous solution, and has an advantage of a rapid reaction rate with carbon dioxide, but also has a disadvantage of requiring high regeneration energy in a desorption process after absorbing carbon dioxide due to the high heat capacity of water (4.20 kJ/kg° C.). In addition, an amine-based absorbent has a disadvantage of being easily deteriorated or causing device corrosion by heat and oxygen, and a decomposition product having a low boiling point is released into the atmosphere, so that it is likely to cause an environmental problem.

Thus, development of an absorbent, which has a high boiling point, so that it is unlikely to be released into the atmosphere, is chemically stable to decrease the release of the decomposition product into the atmosphere, and may desorb carbon dioxide with low regeneration energy, is needed.

SUMMARY OF THE INVENTION

An object of the present disclosure is to provide a carbon dioxide absorbent which may capture carbon dioxide with high performance and is capable of efficient desorption under easy conditions.

Another object of the present disclosure is to provide a carbon dioxide supplying agent comprising a compound formed by reacting the carbon dioxide absorbent with carbon dioxide.

Still another object of the present disclosure is to provide a method of separating carbon dioxide comprising reacting the carbon dioxide absorbent.

Still another object of the present disclosure is to provide a method of capturing carbon dioxide.

Still another object of the present disclosure is to provide a method of reducing greenhouse gas emissions.

Technical Solution

In one general aspect, a carbon dioxide absorbent comprises: an ionic liquid comprising an imidazole-based anion; and an aliphatic alcohol.

In another general aspect, a carbon dioxide supplying agent comprises: a compound formed by reacting the carbon dioxide absorbent with carbon dioxide and an aliphatic carbonate.

In still another general aspect, a method of separating carbon dioxide comprises: bringing a carbon dioxide absorbent comprising an ionic liquid comprising an imidazole-based anion; and an aliphatic alcohol into contact with a mixture comprising carbon dioxide under the temperature condition of 20° C. to 80° C.

In still another general aspect, a method of capturing carbon dioxide, method of capturing carbon dioxide, comprising contacting carbon dioxide with a carbon dioxide absorbent comprising: an ionic liquid comprising an imidazole-based anion; and an aliphatic alcohol.

In still another general aspect, A method of reducing greenhouse gas emissions comprising carbon dioxide, comprising: contacting the greenhouse gas emissions with a carbon dioxide absorbent comprising: an ionic liquid comprising an imidazole-based anion; and an aliphatic alcohol whereby the carbon dioxide absorbent captures carbon dioxide from the greenhouse gas emissions.

Advantageous Effects

The present disclosure relates to a carbon dioxide absorbent comprising an ionic liquid comprising an imidazole-based anion and an aliphatic alcohol, and since an alcohol solvent comprised in the carbon dioxide absorbent according to one embodiment has low toxicity and a very high boiling point, the carbon dioxide absorbent has no problem of release into the atmosphere and consequent environmental pollution, and is chemically stable to significantly lower the possibility of release of decomposition products into the atmosphere. In addition, the carbon dioxide absorbent is also effective, since it may absorb carbon dioxide with a higher equivalent than an absorbent input equivalent, and has low regeneration energy so that carbon dioxide is easily desorbed.

DESCRIPTION OF THE INVENTION

Figure 1:
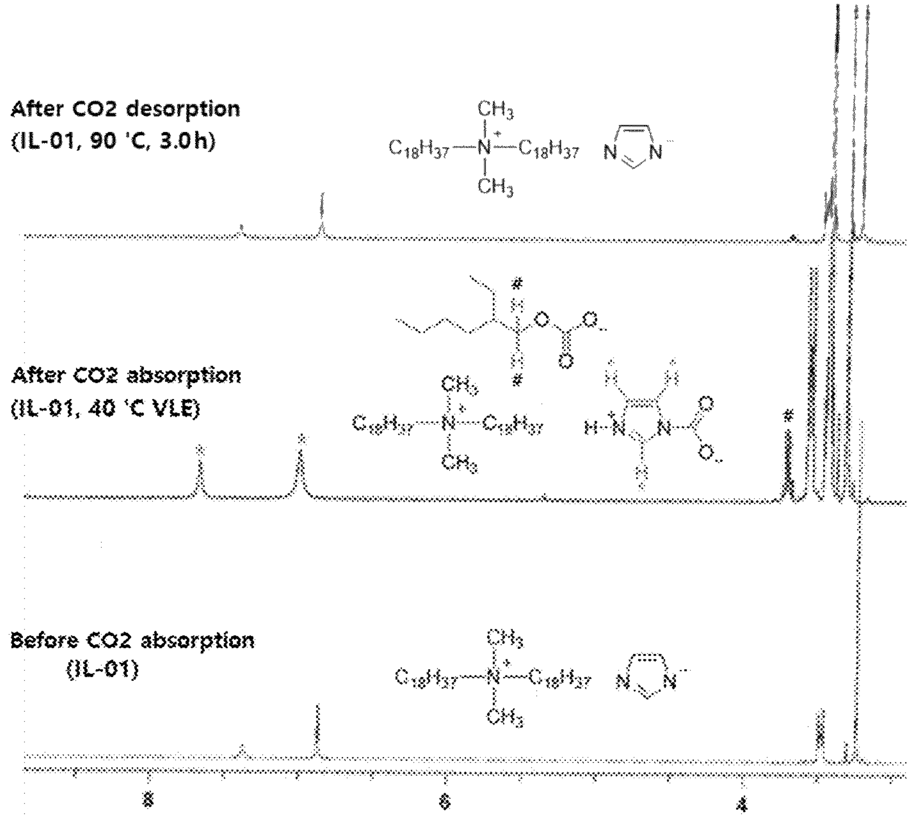
FIG. 1 is a drawing showing results of $^{1}H$ NMR analysis before absorption of the carbon dioxide absorbent according to Example 1, after absorbing carbon dioxide under the condition of 40° C., and after desorbing carbon dioxide under the conditions of 90° C. and 3.0 h, in order to confirm simultaneous production of carbamate and carbonate after carbon dioxide absorption and regeneration of cations and imidazole anions after carbon dioxide desorption.

Hereinafter, one implementation and embodiments will be described in detail.

Meanwhile, the embodiments of one implementation may be modified in various different forms, and the scope of one implementation is not limited to the embodiments set forth herein. In addition, the embodiments of one implementation are provided so that one implementation will be described in more detail to a person with ordinary skill in the art. Furthermore, unless explicitly described otherwise, "comprising" any components will be understood to imply the inclusion of other components but not the exclusion of any other components.

One implementation provides a carbon dioxide absorbent comprising: an ionic liquid comprising an imidazole-based anion; and an aliphatic alcohol.

Since the imidazole-based anion may function as an anion (base) comprised in the ionic liquid provided in one embodiment as long as it comprises imidazole ($C_3N_2H_4$) and is a negatively charged compound, its structure is not particularly limited. For example, the imidazole-based anion may be represented by the following Chemical Formula 1:

[Chemical Formula 1]

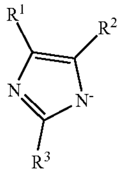

Wherein $R^1$, $R^2$, and $R^3$ are independently of one another hydrogen, substituted or unsubstituted $C_{1-10}$ alkyl, or substituted unsubstituted $C_{1-10}$ alkylcarbonyl, substituted or unsubstituted $C_{1-10}$ alkoxy, substituted or unsubstituted $C_{3-8}$ cycloalkyl, substituted or unsubstituted 5- to 10-membered heterocycloalkyl containing one or more heteroatoms selected from the group consisting of N, O, and S, substituted or unsubstituted $C_{5-10}$ aryl, or substituted or unsubstituted 5- to 10-membered heteroaryl containing one or more heteroatoms selected from the group consisting of N, O, and S, or $R^1$ and $R^2$ may be connected with a carbon atom to which $R^1$ and $R^2$ are bonded to form substituted or unsubstituted $C_{3-8}$ cycloalkyl, substituted or unsubstituted 5- to 10-membered heterocycloalkyl containing one or more heteroatoms selected from the group consisting of N, O, and S, substituted or unsubstituted $C_{5-10}$ aryl, or substituted or unsubstituted 5- to 10-membered heteroaryl containing one or more heteroatoms selected from the group consisting of N, O, and S, and the substitution may be each substitution by one or more substituents selected from the group consisting of halo, oxo, cyano, amino, nitrile, $C_{1-10}$ alkyl, $C_{1-10}$ alkylcarbonyl, and $C_{1-10}$ alkoxy.

Alternatively, $R^1$, $R^2$, and $R^3$ may be independently of one another hydrogen, substituted or unsubstituted $C_{1-8}$ alkyl, substituted or unsubstituted $C_{1-8}$ alkylcarbonyl, substituted or unsubstituted $C_{1-8}$ alkoxy, substituted or unsubstituted $C_{3-6}$ cycloalkyl, substituted or unsubstituted 5- to 8-membered heterocycloalkyl containing one or more heteroatoms selected from the group consisting of N, O, and S, substituted or unsubstituted $C_{5-8}$ aryl, or substituted or unsubstituted 5- to 8-membered heteroaryl containing one or more heteroatoms selected from the group consisting of N, O, and S.

Alternatively, $R^1$, $R^2$, and $R^3$ may be independently of one another hydrogen, substituted or unsubstituted $C_{1-5}$ alkyl, substituted or unsubstituted $C_{1-5}$ alkylcarbonyl, or substituted or unsubstituted $C_{1-5}$ alkoxy, or $R^1$ and $R^2$ may be connected with a carbon atom to which $R^1$ and $R^2$ are bonded to form substituted or unsubstituted $C_{5-8}$ cycloalkyl, substituted or unsubstituted 5- to 8-membered heterocycloalkyl containing one or more heteroatoms selected from the group consisting of N, O, and S, substituted or unsubstituted $C_{5-8}$ aryl, or substituted or unsubstituted 5- to 8-membered heteroaryl containing one or more heteroatoms selected from the group consisting of N, O, and S, and the substitution may be each substitution by one or more substituents selected from the group consisting of halo, oxo, and $C_{1-5}$ alkyl.

Alternatively, $R^1$, $R^2$, and $R^3$ may be independently of one another hydrogen, substituted or unsubstituted $C_{1-3}$ alkyl, substituted or unsubstituted $C_{1-3}$ alkylcarbonyl, or substituted or unsubstituted $C_{1-3}$ alkoxy, or $R^1$ and $R^2$ may be connected with a carbon atom to which $R^1$ and $R^2$ are bonded to form substituted or unsubstituted $C_{5-6}$ cycloalkyl, substituted or unsubstituted 5- and 6-membered heterocycloalkyl containing one or more heteroatoms selected from the group consisting of N, O, and S, substituted or unsubstituted $C_{5-6}$ aryl, or substituted or unsubstituted 5- and 6-membered heteroaryl containing one or more heteroatoms selected from the group consisting of N, O, and S, and the substitution may be each substitution by one or more substituents selected from the group consisting of halo, oxo, and $C_{1-3}$ alkyl.

Alternatively, a specific example of the imidazole-based anion may be an imidazole anion (  ), a benzimidazole anion

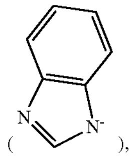, purine

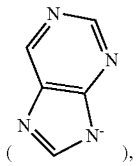, or theophylline

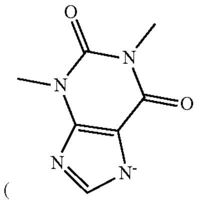.

However, as described above, any imidazole-based anion may efficiently react with carbon dioxide in a nitrogen anion site to absorb or capture carbon dioxide, and thus, its structure is not limited.

The ionic liquid further comprises a cation, and the cation is not limited in its structure or kind as long as it is a positively charged compound. For example, it may be one or more selected from the group consisting of ammonium, phosphonium, pyridinium, imidazolium, sulfonium, pyrrolidinium, piperidinium, pyrazolium, guanidinium, morpholinium, and derivatives thereof. The derivative may be in the form of the cation substituted by any one or more substituents known to a person skilled in the art, two or more cations or derivatives thereof being connected by a linker known to a person skilled in the art, the cation to which a cyclic compound is conjugated, or a hydrogenated aromatic compound, but is not limited thereto. For example, the substituent may be halogen, $C_{1-30}$ aliphatic hydrocarbon, $C_{5-30}$ aromatic hydrocarbon, —OH, —COOH, —$C_{1-30}$ alkyl-OH, or —$C_{1-30}$—COOH, but is not necessarily limited thereto, and the linker may be a $C_{1-30}$ hydrocarbon chain or a hydrocarbon chain of which the carbon is substituted by one or more heteroatoms selected from the group consisting of N, O, and S, but is not necessarily limited thereto.

The aliphatic alcohol may be a $C_{1-30}$ aliphatic alcohol, a $C_{2-30}$ aliphatic alcohol, a $C_{2-15}$ aliphatic alcohol, a $C_{2-12}$ aliphatic alcohol, or a $C_{2-10}$ aliphatic alcohol, or, for example, may be a monohydric alcohol or a polyhydric alcohol having two or more hydroxyl groups. Alternatively, the polyhydric alcohol may be an alcohol having 2 to 4 hydroxyl groups. Since any aliphatic alcohol having one or more hydroxyl groups may react with carbon dioxide to absorb or capture carbon dioxide, as a solvent of the carbon dioxide absorbent provided in one embodiment, the aliphatic alcohol is not limited in its kind or structure.

The carbon dioxide absorbent according to one embodiment comprises the aliphatic alcohol as a solvent, thereby producing both a carbamate by a reaction of anion and carbon dioxide and an alkyl carbonate by an alcohol reaction, and thus, it is effective since it may absorb carbon dioxide with higher capturing performance than an absorbent input equivalent, and is also effective as a carbon dioxide supplying agent since it may desorb carbon dioxide with low regeneration energy.

The aliphatic alcohol may be, for example, a saturated aliphatic alcohol, an unsaturated aliphatic alcohol, or an alcohol containing a cyclic structure. Alternatively, it may be $C_{3-15}$ branched-chain alcohol, $C_{4-15}$ branched-chain alcohol, $C_{5-15}$ branched-chain alcohol, $C_{5-10}$ branched-chain alcohol, or $C_{2-15}$ polyhydric alcohol, or $C_{2-10}$ polyhydric alcohol. Specifically, for example, it may be one or more selected from the group consisting of 2-ethylhexnaol, 2-methyl-1,3-propanediol, 1,3-propanediol, 2,2-dimethyl-1,3-propanediol, 1,4-butanediol, 1,3-butanediol, 1,2-butanediol, 2,3-butanediol, pinacol, ethylene glycol, propylene glycol, diethylene glycol, dipropylene glycol, triethylene glycol, tetraethyleneglycol, 3-methoxy-3-methyl-1-butanol, 3-methoxy-1-butanol, 1-methoxy-2-butanol, glycol monoether, n-propyl alcohol, isopropyl alcohol, 1-butanol, 2-butanol, isobutyl alcohol, tert-butyl alcohol, 2-pentanol, t-pentyl alcohol, 1-hexnaol, allyl alcohol, propargyl alcohol, 2-butenyl alcohol, 3-butenyl alcohol, and 4-penten-2-ol.

The aliphatic alcohol may have a boiling point of 130° C. or higher. The boiling point is not necessarily limited to the above range, and may be 140° C. or higher, 150° C. or higher, 160° C. or higher, 170° C. or higher, 180° C. or higher, or 190° C. or higher. Since water which is conventionally used as a solvent of the carbon dioxide absorbent has a low boiling point of 100° C. or lower, the decomposition product is highly likely to be released into the atmosphere, but the alcohol solvent provided in one embodiment has a very high boiling point, so that it is unlikely to be released into the atmosphere, and it is chemically stable, so that a possibility to release the decomposition product into the atmosphere may be significantly lowered.

The aliphatic alcohol may have a heat capacity of 4.0 kJ/kg° C. or less. The heat capacity is not necessarily limited to the range, and may be 3.5 kJ/kg° C. or less, 3.0 kJ/kg° C. or less, 2.8 kJ/kg° C. or less, or 2.5 kJ/kg° C. or less. An amine-based absorbent which is conventionally used as a carbon dioxide absorbent (for example, mono-ethanolamine (MEA)) is used as a 30 wt % aqueous solution, and due to the high heat capacity of water (about 4.20 kJ/kg° C.) used as the solvent, high regeneration energy is needed in the desorption process. Besides, the amine-based absorbent is easily thermally decomposed or oxidatively decomposed by heat or oxygen, thereby causing an environmental issue due to the release of the decomposition product into the atmosphere. In contrast, the carbon dioxide absorbent according to one embodiment uses an ionic liquid comprising an imidazole-based anion with an alcohol solvent, thereby lowering a heat capacity and significantly improving the regeneration energy of the absorbent as compared with the conventional absorbent.

The carbon dioxide absorbent according to one embodiment may have an absorption equivalent represented by the following Equation 1 of 0.7 or more:

$$\text{Carbon dioxide absorption equivalent} = (\text{number of moles of absorbed carbon dioxide})/(\text{number of moles of absorbent}) \quad \text{[Equation 1]}$$

That is, it is a value obtained by calculating the equivalent of absorbed carbon dioxide to the equivalent of the input absorbent.

The absorption equivalent may be 0.7 or more, 0.75 or more, 0.8 or more, 0.9 or more, 1.0 or more, 1.3 or more, or 1.5 or more.

In one embodiment, since carbon dioxide may react with an imidazole anion of the absorbent to form a carbamate (Reaction Formula 1), and also, may react with an alcohol to form a carbonate (Reaction Formula 2), it may show high carbon dioxide absorption performance as compared with the conventional technology:

[Reaction Formula 1]

$$CO_2 + [\text{Cation}^+]\ [\text{imidazole}{-}N^-] \longrightarrow [\text{Cation}^+]\ [\text{imidazole}{-}N{-}CO_2^-]$$

[Reaction Formula 2]

$$CO_2 + [\text{Cation}^+]\ [\text{imidazole}{-}N{-}CO_2^-] + R{-}OH \longrightarrow [\text{cation}^+]\ [H{-}\text{imidazole}^+{-}N{-}CO_2^-]\ [R{-}O{-}CO_2]^-$$

Another implementation provides a carbon dioxide supplying agent comprising: a compound formed by reacting a carbon dioxide absorbent comprising an ionic liquid comprising the imidazole-based anion and an aliphatic alcohol with carbon dioxide; and an aliphatic carbonate.

The compound formed by reacting the carbon dioxide absorbent with carbon dioxide may be a compound represented by the following Chemical Formula 2:

[Chemical Formula 2]

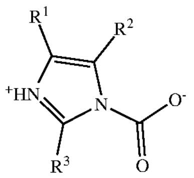

wherein $R^1$, $R^2$, and $R^3$ are as defined above.

Another implementation provides a method of separating carbon dioxide comprising: bringing a carbon dioxide absorbent comprising an ionic liquid comprising an imidazole-based anion and an aliphatic alcohol into contact with a mixture comprising carbon dioxide under the temperature condition of 20° C. to 80° C.

Here, the temperature condition is not necessarily limited to the range, and may be adjusted to an appropriate temperature range where carbon dioxide is absorbed, and for example, may be 20° C. to 60° C., 25° C. to 55° C., 30° C. to 50° C., or 40° C. In addition, the step may be performed under the pressure condition of, for example, 0.1 bar to 2.0 bar, 0.5 bar to 2.0 bar, 0.5 bar to 1.5 bar, 0.7 bar to 1.3 bar, or 1.0 bar, and the pressure condition of the step is not limited thereto.

The method of separating carbon dioxide may further comprise heat treating the carbon dioxide absorbent under the temperature condition of 70° C. to 150° C. and a $N_2$ flow of 100 cc/min to 300 cc/min for 30 minutes to 250 minutes to desorb carbon dioxide adhering to the absorbent. Here, the temperature condition is not necessarily limited to the range, and the heat treatment may be performed, for example, at 80° C. to 130° C., 80° C. to 120° C., 80° C. to 130° C., 80° C. to 120° C., 80° C. to 110° C., 85° C. to 120° C., 85° C. to 110° C., or 90° C. to 110° C. In addition, the time condition is not necessarily limited to the range, and the heat treatment may be performed for example, for 30 minutes to 210 minutes, 50 minutes to 210 minutes, 60 minutes to 250 minutes, 60 minutes to 200 minutes, or 60 minutes to 180 minutes. In addition, the $N_2$ flow condition is not necessarily limited to the range, and may be, for example, 150 cc/min to 250 cc/min, 180 cc/min to 220 cc/min, or 200 cc/min.

The desorbing of carbon dioxide according to one embodiment may be performed within a short time at a lower temperature as compared with the case of using an amine-based absorbent conventionally used as an absorbent (for example, MEA). That is, the carbon dioxide absorbent according to one embodiment uses an alcohol solvent, thereby lowering a heat capacity and producing both carbamate and carbonate to significantly lower regeneration energy as compared with the conventional absorbent, and thus, carbon dioxide desorption efficiency is very high.

In addition, the method of separating carbon dioxide may be a method of continuously separating carbon dioxide by repeating bringing carbon dioxide into contact with the absorbent to absorb carbon dioxide and desorbing carbon dioxide adhering to the absorbent.

The method of separating carbon dioxide according to one embodiment significantly improves viscosity after absorption of carbon dioxide as compared with viscosity before absorption of carbon dioxide, thereby significantly efficiently performing absorption/desorption of carbon dioxide. When carbamate or carbonate is produced using a conventional carbon dioxide absorbent, the viscosity of a reaction solution is increased to lower continuous carbon dioxide absorption reaction efficiency, and a high temperature condition for a long time is needed when carbon dioxide is desorbed again after absorbing carbon dioxide. Since the carbon dioxide absorbent according to one embodiment has a rather lowered viscosity after capturing, it is very effective for absorption and desorption of carbon dioxide.

One implementation provides a method of capturing carbon dioxide, comprising contacting carbon dioxide with a carbon dioxide absorbent comprising: an ionic liquid comprising an imidazole-based anion; and an aliphatic alcohol.

In one embodiment, for example, the carbon dioxide is absorbed from combustion exhaust gas.

In another implementation provides a method of reducing greenhouse gas emissions comprising carbon dioxide, comprising: contacting the greenhouse gas emissions with a carbon dioxide absorbent comprising: an ionic liquid comprising an imidazole-based anion; and an aliphatic alcohol whereby the carbon dioxide absorbent captures carbon dioxide from the greenhouse gas emissions.

Mode for Invention

Hereinafter, the examples and the experimental examples will be illustrated in detail. However, the examples and the experimental examples described later are only illustrative of a part of one implementation, and one implementation is not limited thereto.

<Preparation of Ionic Liquid (IL)>

1. Preparation of IL-01

8.56 g (14.6 mmol) of dimethyldioctadecylammonium chloride, 1.31 g (14.6 mmol) of sodium imidazolate, and 25 mL of ethanol were added to 100 mL of RBF (Round bottom flask), and then the solution was stirred at room temperature for 2 hours. The reactant was dried under vacuum, 30 mL of acetone was added thereto, the solution was stirred for 1 hour, the produced solid was filtered, and the filtrate was dried under vacuum at 50° C. for 15 hours to obtain 8.21 g (91%) of transparent oil.

$^1$H NMR (500 MHz), d-acetone, 25° C.: δ=7.41 (s, 1H), 6.89 (s, 2H), 3.50 (m, 4H), 3.25 (s, 6H), 1.85 (br, 4H), 1.35 (br, 60H), 0.89 (t, 6H)

2. Preparation of IL-02

10.00 g (17. 0 mmol) of dimethyldioctadecylammonium chloride, 2.38 g (17.0 mmol) of sodium benzimidazolate, and 30 mL of ethanol were added to 100 mL of RBF, and then the solution was stirred at room temperature for 2 hours. The reactant was dried under vacuum, 30 mL of acetone was added thereinto, the solution was stirred for 1 hour, the produced solid was filtered, and the filtrate was dried under vacuum at 50° C. for 15 hours to obtain 10.50 g (93%) of a white solid.

$^1$H NMR (500 MHz), d-acetone, 25° C.: δ=7.90 (s, 1H), 7.51 (d, 2H), 6.85 (d, 2H), 3.48 (m, 4H), 3.21 (s, 6H), 1.85 (br, 4H), 1.35 (br, 60H), 0.87 (t, 6H)

3. Preparation of IL-03

10.0 g (121.0 mmol) of methyl imidazole and 12.3 g (97.4 mmol) of 1, 4-dibromobutane were added to 100 mL of RBF, and the solution was heated to 100° C. and stirred for 6 hours. The reactant was added to 100 mL of ethyl acetate, and the solution was stirred for 2 hours to produce a white solid, which was filtered and dried under vacuum for 3 hours. Next, 16.9 g (121.0 mmol) of sodium benzimidazolate and 50 mL of ethanol were added to the produced white solid, the solution was stirred at room temperature for 2 hours, the produced solid was filtered and removed, and then the filtrate was dried under vacuum at 50° C. for 15 hours to obtain 21.2 g (95%) of a white solid.

$^1$H NMR (500 MHz), d-DMSO, 25° C.: δ=9.15 (br, 2H), 7. 75 (s, 4H), 7.70 (s, 2H), 7.35 (d, 4H), 6.75 (d, 2H), 4.15 (br, 4H), 3.83 (s, 6H), 1.69 (br, 4H)

4. Preparation of IL-04

10.0 g (121.0 mmol) of methyl imidazole and 12.3 g (97.4 mmol) of 1,4-dibromobutane were added to 100 mL of RBF, and the solution was heated to 100° C. and stirred for 6 hours. The reactant was added to 100 mL of ethyl acetate, and the solution was stirred for 2 hours to produce a white solid, which was filtered and dried under vacuum for 3 hours. Next, 10.9 g (121.0 mmol) of sodium imidazolate and 50 mL of ethanol were added to the produced white solid, the solution was stirred at room temperature for 2 hours, the produced solid was filtered and removed, and then the filtrate was dried under vacuum at 50° C. for 15 hours to obtain 17.6 g (91%) of a white solid.

$^1$H NMR (500 MHz), d-DMSO, 25° C.: δ=7. 75 (s, 2H), 7. 70 (s, 2H), 7.09 (s, 2H), 6.65 (s, 4H), 4.17 (br, 4H), 3.81 (s, 6H), 1.71 (br, 4H)

5. Preparation of IL-05

4.60 g (27.8 mmol) of tetraethylammonium chloride, 2.50 g (27.8 mmol) of sodium imidazolate, and 10 mL of distilled water were added to 100 mL of RBF, and the solution was stirred at room temperature for 2 hours and dried under vacuum at 50° C. for 5 hours. Next, 20 mL of ethanol was added thereto, the solution was stirred at room temperature for 2 hours to produce a white solid, which was then removed, and the filtrate was dried under vacuum at 50° C. for 15 hours to obtain 5.1 g (93%) of a highly viscous yellow liquid.

$^1$H NMR (500 MHz), $D_2O$, 25° C.: δ=7.63 (s, 1H), 7.04 (s, 2H), 3.12 (m, 8H), 1.15 (m, 12H)

6. Preparation of IL-06

4.63 g (16.7 mmol) of tetrabutylammonium chloride, 1.50 g (16.7 mol) of sodium imidazolate, and 10 mL of distilled water were added to 100 mL of RBF, and the solution was stirred at room temperature for 2 hours and dried under vacuum at 50° C. for 5 hours. Next, 20 mL of ethanol was added thereto, the solution was stirred at room temperature for 2 hours to produce a white solid which was then removed, and the filtrate was dried under vacuum at 50° C. for 15 hours to obtain 4.7 g (92%) of a highly viscous yellow liquid.

$^1$H NMR (500 MHz), $D_2O$, 25° C.: δ=7.70 (s, 1H), 7.10 (s, 2H), 3.13 (m, 8H), 1.59 (m, 8H), 1.31 (m, 8H), 0.91 (m, 12H)

7. Preparation of IL-07

5.00 g (21.2 mmol) of decyltrimethylammonium chloride, 1.44 g (21.2 mol) of sodium imidazolate, and 10 mL of ethanol were added to 100 mL of RBF, and the solution was stirred at room temperature for 2 hours and dried under vacuum at 50° C. for 5 hours. Next, 20 mL of acetone was added thereto, the solution was stirred at room temperature for 2 hours to produce a white solid which was then removed, and the filtrate was dried under vacuum at 50° C. for 15 hours to obtain 5.05 g (89%) of a highly viscous yellow liquid.

$^1$H NMR (500 MHz), d-DMSO, 25° C.: δ=7.13 (s, 1H), 6. 69 (s, 2H), 3.28 (t, 2H), 3.01 (s, 9H), 1.65 (m, 2H), 1.30 (m, 14H), 0.87 (m, 3H)

8. Preparation of IL-08

10.0 g (121 mmol) of methyl imidazole and 20.1 g (107 mmol) of 1,2-bis(2-chloroethoxy) ethane were added to 100 mL of RBF, and the solution was heated to 100° C. and stirred for 6 hours. Next, the reactant was added to 100 mL of ethyl acetate, and the solution was stirred for 2 hours to produce a white solid, which was filtered and dried under vacuum for 3 hours. 10.9 g (121.0 mmol) of sodium imidazolate and 50 mL of ethanol were added to the produced light yellow oil, the solution was stirred at room temperature for 2 hours, the produced solid was filtered and removed, and then the filtrate was dried under vacuum at 50° C. for 15 hours to obtain 24.2 g (97%) of a light yellow oil.

$^1$H NMR (500 MHz), d-DMSO, 25° C.: δ=7.71 (s, 4H), 7.09 (s, 2H), 6.66 (s, 4H), 4.30 (br, 4H), 3.85 (s, 6H), 3.73 (br, 4H), 3.52 (s, 4H)

9. Preparation of IL-09

10.0 g (121 mmol) of methyl imidazole and 20.1 g (107 mmol) of 1,2-bis(2-chloroethoxyethane) were added to 100 mL of RBF, and the solution was heated to 100° C. and stirred for 6 hours. Next, the reactant was added to 100 mL of ethyl acetate, and the solution was stirred for 2 hours to produce a white solid, which was filtered and dried under vacuum for 3 hours. 16.9 g (121.0 mmol) of sodium benzimidazolate and 50 mL of ethanol were added to the produced light yellow oil, the solution was stirred at room temperature for 2 hours, the produced solid was filtered and removed, and then the filtrate was dried under vacuum at 50° C. for 15 hours to obtain 24.8 g (95%) of a light yellow oil.

$^{1}$H NMR (500 MHz), d-DMSO, 25° C.: δ=9.15 (br, 2H), 7.75 (s, 2H), 7.70 (d, 4H), 6.77 (d, 4H), 4.30 (br, 4H), 3.85 (s, 6H), 3.71 (br, 4H), 3.51 (s, 4H)

10. Preparation of IL-10

2.00 g (3.41 mmol) of dimethyldioctadecylammonium chloride, 0.69 g (3.14 mmol) of sodium theophylline, and 10 mL of ethanol were added to 50 mL of RBF, and then the solution was stirred at room temperature for 2 hours. The reactant was dried under vacuum, 30 mL of acetone was added thereto, and the solution was stirred for 1 hour. The produced solid was filtered, and the filtrate was dried under vacuum at 50° C. for 15 hours to obtain 2.26 g (91%) of a white solid.

$^{1}$H NMR (500 MHz), d-acetone, 25° C.: δ=7.10 (s, 1H), 3. 38 (s, 3H), 3.33 (s, 6H), 3.23 (br, 4H), 3.18 (s, 6H), 1.62 (br, 4H), 1.35 (br, 60H), 0.87 (t, 6H)

11. Preparation of IL-11

5.26 g (37.6 mmol) of choline chloride, 3.77 g (37.6 mmol) of sodium imidazolate, and 20 mL of ethanol were added to 100 mL of RBF, and then the solution was stirred at room temperature for 2 hours. The produced solid was filtered out of the reactant, and the filtrate was dried under vacuum at 50° C. for 15 hours to obtain 5.92 g (92%) of a light yellow oil.

$^{1}$H NMR (500 MHz), d-DMSO, 25° C.: δ=7.69 (s, 1H), 7.05 (s, 2H), 3.96 (br, 2H), 3.41 (br, 2H), 3.11 (s, 9)

12. Preparation of IL-12

2.0 g (8.8 mmol) of tetraethylphosphonium bromide, 1.0 g (8.8 mol) of sodium imidazolate, and 10 mL of distilled water were added to 100 mL of RBF, and the solution was stirred at room temperature for 2 hours and dried under vacuum at 50° C. for 5 hours. Next, 20 mL of ethanol was added thereto, the solution was stirred at room temperature for 2 hours to produce a white solid which was then removed, and the filtrate was dried under vacuum at 50° C. for 15 hours to obtain 1.75 g (93%) of a highly viscous yellow liquid.

$^{1}$H NMR (500 MHz), D2O, 25° C.: δ=7.69 (s, 1H), 7.08 (s, 2H), 2.14 (m, 8H), 1.16 (m, 12H)

13. Preparation of IL-13

3.00 g (21.4 mmol) of choline chloride, 3.16 g (22.5 mmol) of sodium benzimidazolate, and 12 mL of ethanol were added to 50 mL of RBF, and then the solution was stirred at room temperature for 2 hours. The produced solid was filtered out of the reactant, and the filtrate was dried under vacuum at 50° C. for 15 hours to obtain 4.4 g (93%) of a light yellow oil.

$^{1}$H NMR (500 MHz), d-DMSO, 25° C.: δ=7.77 (s, 1H), 7. 35 (d, 2H), 6.80 (d, 2H), 3.88 (br, 2H), 3.41 (br, 2H), 3.11 (s, 9)

14. Preparation of IL-14

5.00 g (32.5 mmol) of betaine chloride, 2.93 g (32.5 mmol) of sodium imidazolate, and 20 mL of ethanol were added to 50 mL of RBF, and then the solution was stirred at room temperature for 2 hours. The produced solid was filtered out of the reactant, and the filtrate was dried under vacuum at 50° C. for 15 hours to obtain 5.5 g (90%) of a white solid.

$^{1}$H NMR (500 MHz), d-DMSO, 25° C.: δ=7.61 (s, 1H), 7.00 (s, 2H), 3.61 (s, 2H), 3.13 (s, 9)

The structural formulae of the ionic liquids IL-01 to IL-14 prepared above are summarized in the following Table 1:

TABLE 1

| IL | Structural Formula |
|---|---|
| 01 | 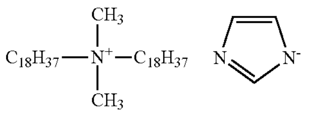 |
| 02 | 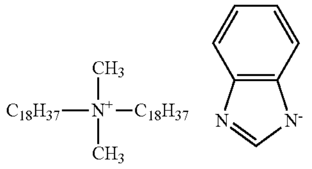 |
| 03 | 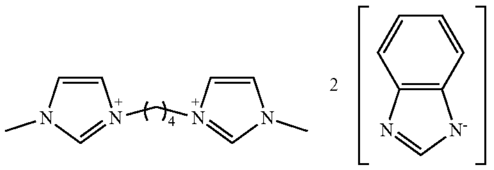 |
| 04 | 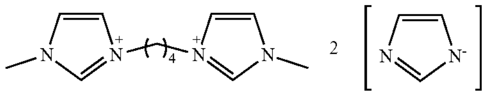 |
| 05 | 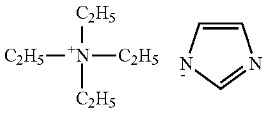 |

TABLE 1-continued
| IL | Structural Formula |
|---|---|
| 06 | 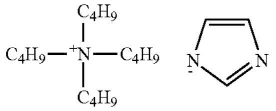 |
| 07 | 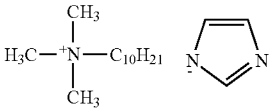 |
| 08 | 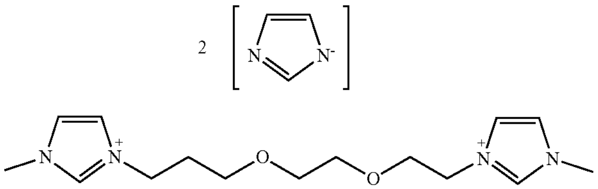 |
| 09 | 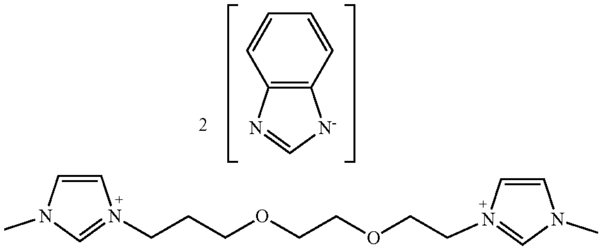 |
| 10 | 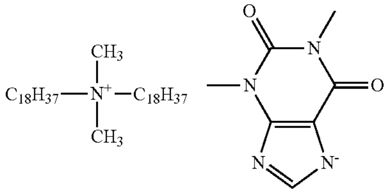 |
| 11 | 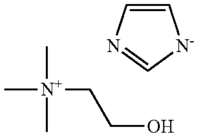 |
| 12 | 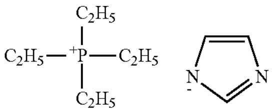 |
| 13 | 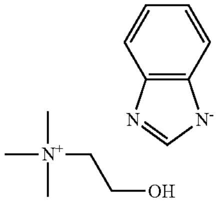 |
| 14 | 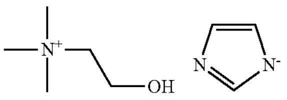 |

Examples 1 to 16

Carbon dioxide absorbents according to Examples 1 to 16 comprising alcohol solvents and 30 wt of the ionic liquids (IL) prepared above were prepared. The ionic liquids and the alcohol solvents comprised in Examples 1 to 16 are summarized in Table 2.

Comparative Examples 1 to 6

Carbon dioxide absorbents according to Comparative Examples 1 to 5 comprising water and 30 wt % of ionic liquids (IL) prepared above were prepared, and in Comparative Example 6, mono-ethanolamine (MEA) of a 30 wt % aqueous solution conventionally used as a carbon dioxide absorbent was prepared. The ionic liquids and the kinds of solvent comprised in Comparative Examples 1 to 6 are summarized in the following Table 3.

<Experimental Example 1> Evaluation of Carbon Dioxide Absorption Performance

In order to evaluate carbon dioxide absorption performance of the carbon dioxide absorbents according to Examples 1 to 16 and Comparative Examples 1 to 6, carbon dioxide absorption performance was measured using a vapor liquid equilibrium (BLE) apparatus. As the vapor liquid equilibrium apparatus, an apparatus comprising a cylinder for storing carbon dioxide (150 mL), a constant temperature water bath, a stainless steel absorption reactor equipped with a thermometer (73 mL), an electronic pressure gauge, and an agitator was used. At this time, absorption ability was measured by maintaining a constant temperature of 40° C. in the cylinder and the reactor using a constant temperature water bath and a heating block, respectively. A measurement error range of the reactor was ±0.1° C. and ±0.01 bar.

Evaluation of carbon dioxide absorption performance was performed specifically by the following method. First, the inside of cylinder for storing carbon dioxide and absorption reactor was sufficiently replaced with nitrogen, and the cylinder for storing carbon dioxide was filled with carbon dioxide and maintained at 40° C. under 1 bar. Next, absorbent (6.0 g) solutions according to Examples 1 to 16 and Comparative Examples 1 to 6 were added to the absorption reactor, the temperature was maintained at 40° C., a valve connecting the cylinder and the reactor was opened to reach absorption equilibrium, and a pressure was measured. An equilibrium pressure was measured every 30 minutes, and the process was repeated until there was no change in pressure between the cylinder and the reactor. Next, an ideal gas equation was used to calculate the number of moles of captured carbon dioxide depending on pressure change. Values obtained by dividing the calculated number of moles of captured carbon dioxide by the number of moles of the absorbent are shown in the following Tables 2 and 3.

<Experimental Example 2> Evaluation of Carbon Dioxide Desorption Performance

In order to evaluate the carbon dioxide desorption performance of the carbon dioxide absorbents according to Examples 1 to 16 and Comparative Examples 1 to 6, the carbon dioxide desorption performance was evaluated using a carbon dioxide ($CO_2$) desorption apparatus, based on the sample evaluated in Experimental Example 1. As the carbon dioxide desorption apparatus, an apparatus comprising a nitrogen flow rate control device, a heating block, a magnetic agitator, and a $N_2$ bubbler was used. At this time, the desorption performance was evaluated at 90° C. to 130° C. while the temperature of the absorbent was maintained at a constant temperature using a heating block and $N_2$ bubbling (200 cc/min) was performed. The measurement error range of the desorption reactor was ±1° C.

Evaluation of carbon dioxide desorption performance was performed specifically by the following method. First, 3.0 g of the carbon dioxide absorbents according to Examples 1 to 16 and Comparative Examples 1 to 6 of which the vapor liquid equilibrium was performed in Experimental Example 1 were added to a reactor, and then stirring was performed while $N_2$ bubbling was performed at a speed of 200 cc/min with a flow rate control device. Next, the reactor was heated to a target temperature, a small amount of sample was taken every 1 hour, $^1$H NMR measurement was performed to observe $^1$H NMR peak shift in an imidazole anion region, the reaction was continued until the $^1$H NMR peak shift which is the same as the absorbent before absorption was observed, and the temperature and the time at completion were confirmed to evaluate desorption performance. The results of evaluating desorption performance are shown in the following Tables 2 and 3:

TABLE 2

| Example No. | Ionic liquid (30 wt %) | Solvent | Absorption performance ($CO_2$-mol/mol) | Desorption condition |
|---|---|---|---|---|
| 1 | IL-01 | 2-ethylhexanol | 1.01 | 90° C., 3.0 h |
| 2 | IL-01 | Ethylene glycol | 1.03 | 90° C., 3.0 h |
| 3 | IL-02 | Ethylene glycol | 0.87 | 90° C., 1.5 h |
| 4 | IL-03 | 2-ethylhexanol | 1.06 | 90° C., 1.5 h |
| 5 | IL-04 | 2-ethylhexanol | 1.77 | 90° C., 1.5 h |
| 6 | IL-05 | 2-ethylhexanol | 0.93 | 100° C., 7.5 h |
| 7 | IL-06 | 2-ethylhexanol | 0.88 | 100° C., 3.5 h |
| 8 | IL-07 | 2-ethylhexanol | 0.75 | 100° C., 3.5 h |
| 9 | IL-08 | 2-ethylhexanol | 1.16 | 100° C., 3.5 h |
| 10 | IL-09 | 2-ethylhexanol | 1.63 | 100° C., 3.5 h |
| 11 | IL-10 | 2-ethylhexanol | 0.36 | 100° C., 3.5 h |
| 12 | IL-11 | 2-ethylhexanol | 0.98 | 90° C., 3.0 h |
| 13 | IL-11 | Ethylene glycol | 1.00 | 90° C., 3.0 h |
| 14 | IL-12 | 2-ethylhexanol | 0.75 | 100° C., 5.5 h |
| 15 | IL-13 | 2-ethylhexanol | 0.70 | 90° C., 2.5 h |
| 16 | IL-14 | 2-ethylhexanol | 0.91 | 100° C., 5.5 h |

TABLE 3

| Comparative Example No. | Ionic liquid (30 wt %) | Solvent | Absorption performance ($CO_2$-mol/mol) | Remarks |
|---|---|---|---|---|
| 1 | IL-01 | $H_2O$ | 0.20 | |
| 2 | IL-04 | $H_2O$ | 1.10 | Solid produced |
| 3 | IL-08 | $H_2O$ | 1.03 | Solid produced |
| 4 | IL-09 | $H_2O$ | 1.38 | Solid produced |
| 5 | IL-11 | $H_2O$ | 0.78 | Solid produced |
| 6 | MEA | $H_2O$ | 0.53 | Desorption temperature: >130° C. |

As a result, as confirmed in Tables 2 and 3 also, the carbon dioxide absorbents according to the examples all showed an excellent absorption performance of 0.70 or more, and in particular, since the absorbents of some examples such as Examples 5, 9, and 10 had an absorption performance of more than 1.00, it was confirmed that those absorbents had a higher carbon dioxide absorption equivalent than the absorption input equivalent and were very efficient.

In contrast, the absorbent of Comparative Example 6 which was used as the conventional carbon dioxide absorbent had an absorption performance of 0.53 and showed significantly low performance as compared with the absorbent of the examples. In addition, the ionic liquid IL-01 had an absorption performance of 1.01 and 1.03, respectively when used with the alcohol solvents in Examples 1 and 2, and thus, showed excellent performance since the carbon dioxide absorption equivalent was higher than the absorption input equivalent, but when the ionic liquid IL-01 was used in an aqueous solution phase in Comparative Example 1, the absorption performance was 0.20, so that carbon dioxide was not effectively absorbed.

Meanwhile, the absorbents of Comparative Examples 2 to 5 all showed the absorption performance of 0.78 or more, and thus, showed absorption performance similar to the absorbents of the examples. However, the absorbents of Comparative Examples 2 to 5 all produced a solid after carbon dioxide absorption, and thus, it is difficult to desorb carbon dioxide, and fouling or plugging occurred during a desorption process to have a limitation to the process application. In addition, the absorbent of Comparative Example 6 which was conventionally used as a carbon dioxide absorbent did not allow desorption under the temperature condition at the level of 100° C., and it was found therefrom that the absorbent of Comparative Example 6 required the temperature condition of 130° C. or higher for desorbing absorbed carbon dioxide.

In contrast, the absorbents of Examples 1 to 16 all allowed easy desorption at a temperature of 90° C. to 100° C., most of the examples allowed desorption within a short time of 3 hours or less, and in particular, in Examples 4 and 5, desorption was performed within a very short time of 1.5 hours, and thus, it was confirmed that carbon dioxide desorption performance was very excellent.

Thus, the absorbents according to the examples showed higher capture performance as compared with the absorbent input equivalent and had low regeneration energy so that it was very easy to desorb carbon dioxide, and the absorbents were very effective for carbon dioxide absorption and desorption.

<Experimental Example 3> NMR Analysis

The absorbents according to the examples used an ionic liquid comprising an imidazole-based anion and an aliphatic alcohol, thereby producing both a carbamate by a reaction of an anion and carbon dioxide and an alkylcarbonate by an alcohol reaction, and thus, are effective since carbon dioxide may be absorbed with higher capture performance than an absorbent input equivalent. In order to confirm this by NMR analysis, the absorbent according to Example 1 before and after carbon dioxide absorption was analyzed by $^{1}H$ NMR and $^{13}C$ NMR, and the results are shown in FIGS. 1 and 2.

As confirmed in FIG. 1, the $^{1}H$ NMR proton peak of a carbamate anion caused by an imidazolate anion of IL-01 after the carbon dioxide absorption reaction was shown at 7.5 ppm and 7.7 ppm, and peak down shift at a level of 0.3 ppm as compared with that before an absorption reaction was observed. The $^{1}H$ NMR proton peak of the carbonate caused by alcohol (2-ethylhexanol) as a solvent was newly produced at 3.7 ppm. In addition, it was confirmed that after $N_2$ bubbling at 90° C. for 3 hours, $^{1}H$ NMR peak shifted to the same position as the imidazolate anion before absorption, and the carbonate $^{1}H$ NMR peak caused by alcohol (2-ethylenehexanol) as the solvent disappeared. Thus, it was confirmed that solvent may be regenerated by securing the same compound as the absorbent before absorption by the carbon dioxide desorption reaction.

Figure 2:
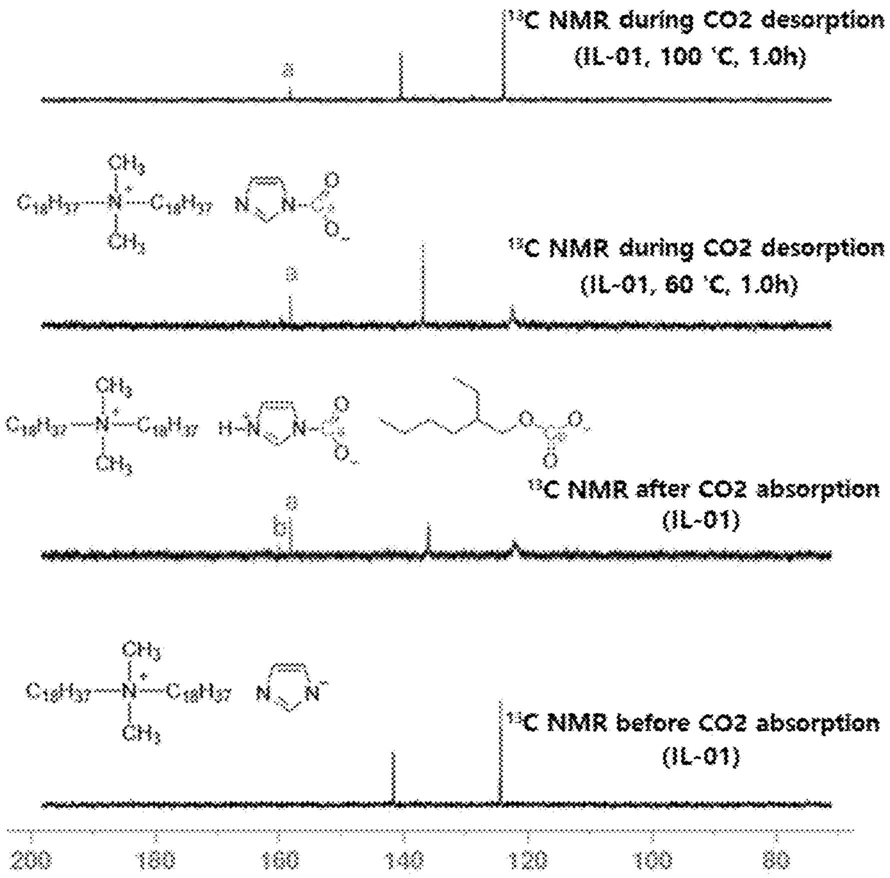
FIG. 2 is a drawing showing results of $^{13}C$ NMR analysis before absorption of the carbon dioxide absorbent according to Example 1, after absorbing carbon dioxide under the condition of 40° C., and after desorbing carbon dioxide under the conditions of 60° C. and 100° C., respectively, for 1 h, in order to confirm simultaneous production of carbamate and carbonate after carbon dioxide absorption and regeneration of cations and imidazole anions after carbon dioxide desorption.

As confirmed from FIG. 2, as a result of $^{13}C$ NMR of IL-01 after the carbon dioxide absorption reaction, two new peaks were observed in the region of 156 ppm to 160 ppm as well as the imidazole carbon peak shift caused by the carbamate production by an imidazolate anion. Therefore, like the $^{1}H$ NMR analysis results, it was confirmed that both carbamate and carbonate were simultaneously produced after the reaction of IL-01 with carbon dioxide. In addition, as a result of $^{13}C$ NMR analysis at 60° C. and 100° C. of a desorption temperature, respectively, it was found that carbonate allowed carbon dioxide desorption at a lower temperature condition than carbamate.

Figure 3:
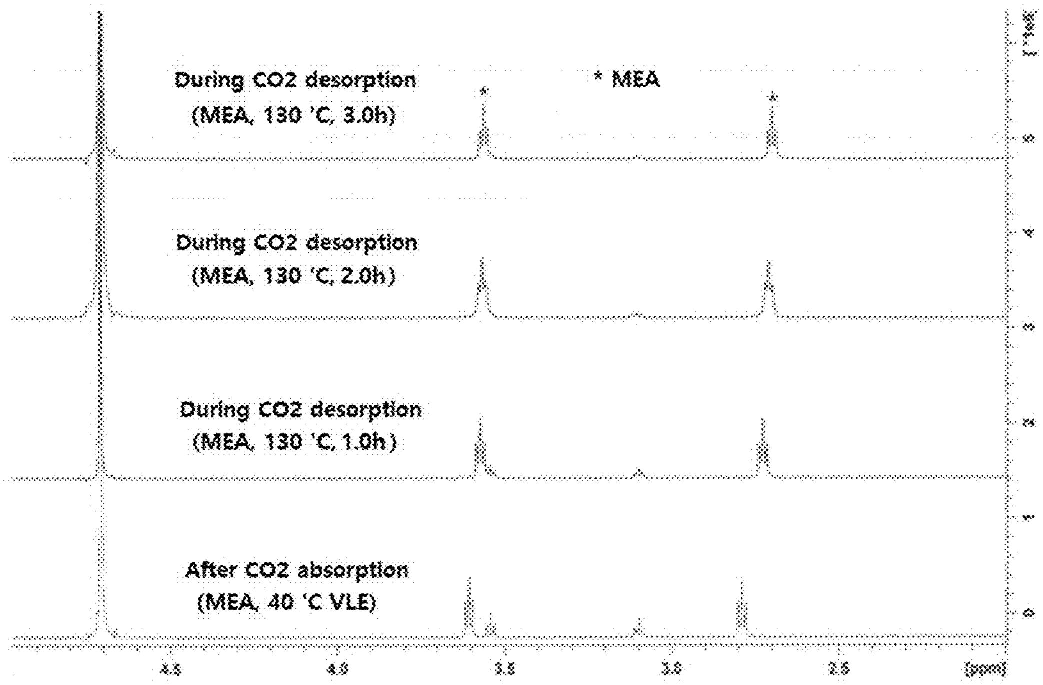
FIG. 3 shows results of $^{13}C$ NMR analysis, after absorbing carbon dioxide with the absorbent of Comparative Example 6 under the condition of 40° C., and after desorbing carbon dioxide at 130° C. for 1 hour, 2 hours, and 3 hours, respectively, for comparison of desorption performance with MEA which is a conventional commercialized absorbent.

Next, for the comparison of desorption performance of MEA which is a conventional commercialized absorbent, the absorbent of Comparative Example 6 absorbed carbon dioxide, and then desorbed carbon dioxide at 130° C. for 1 hour, 2 hours, and 3 hours, and $^{13}C$ NMR analysis was performed and the results are shown in FIG. 3. As a result, in Comparative Example 6, carbon dioxide was not desorbed under the conditions of 1 hour and 2 hours even at a high temperature of 130° C., and was desorbed only after the desorption process for 3 hours to regenerate MEA again. Thus, it was confirmed that the absorbent of the examples had very high desorption performance as compared with Comparative Example 6 which was the conventional commercialized absorbent.

<Experimental Example 4> Evaluation of Viscosity Before and After Carbon Dioxide Absorption The conventional wet carbon dioxide absorbent had a mass transfer problem due to the increased viscosity after carbon dioxide absorption, and thus, it was difficult to desorb absorbed carbon dioxide. Thus, in order to confirm the desorption performance of the absorbents of Examples 1 to 16, viscosities before and after carbon dioxide absorption were evaluated. Brookfield viscometer (DV2TCP model), CPA-40z cone spindle was used for viscosity evaluation.

First, a distance between a cone spindle and a sample cup was adjusted so that a space for an absorbent sample is secured, 0.5 mL each of the absorbents of Examples 1 to 16 was poured into the sample cup, the sample cup was connected to the viscometer, and a tension bar was turned to fix the sample cup. The viscosity measurement condition was revolutions per minute of 30 to 200 rpm, the finish condition was set to 1 minute, and the viscosity was measured in the state in which the temperature of the sample cup was 40° C. At this time, the viscosity was directly calculated in the equipment by measuring torque occurring in a spring connected to the spindle. The viscosity was determined by averaging the three measurements of the Brookfield viscosity, and the results are shown in the following Table 4:

TABLE 4

| Example No. | Ionic liquid (30 wt %) | Solvent | Viscosity (cP) before absorption | Viscosity (cP) after absorption |
|---|---|---|---|---|
| 1 | IL-01 | 2-ethylhexanol | 40.2 | 27.3 |
| 2 | IL-01 | Ethylene glycol | 35.1 | 30.9 |
| 3 | IL-02 | Ethylene glycol | 20.5 | 19.1 |
| 4 | IL-03 | 2-ethylhexanol | N.A | 40.8 |
| 5 | IL-04 | 2-ethylhexanol | N.A | 23.5 |
| 6 | IL-05 | 2-ethylhexanol | N.A | 41.0 |
| 7 | IL-06 | 2-ethylhexanol | N.A | 21.9 |
| 8 | IL-07 | 2-ethylhexanol | N.A | 21.8 |
| 9 | IL-08 | 2-ethylhexanol | N.A | 22.3 |
| 10 | IL-09 | 2-ethylhexanol | N.A | 24.2 |

TABLE 4-continued

| Example No. | Ionic liquid (30 wt %) | Solvent | Viscosity (cP) before absorption | Viscosity (cP) after absorption |
|---|---|---|---|---|
| 11 | IL-10 | 2-ethylhexanol | N.A | 10.4 |
| 12 | IL-11 | 2-ethylhexanol | N.A | 28.8 |
| 13 | IL-11 | Ethylene glycol | N.A | 27.2 |
| 14 | IL-12 | 2-ethylhexanol | N.A | 12.0 |
| 15 | IL-13 | 2-ethylhexanol | N.A | 16.0 |
| 16 | IL-14 | 2-ethylhexanol | N.A | 48.2 |

As a result, as confirmed from Table 4, it was confirmed that the absorbents of Examples 1 to 3 had viscosity which was rather decreased after absorption as compared with the viscosity before absorption. In addition, the absorbents of Examples 4 to 16 also had a low viscosity of almost 30 cP or less. Therefore, since the carbon dioxide absorbents according to the examples did not cause a problem by the increased viscosity after carbon dioxide absorption, it was found that it is easy to vaporize carbon dioxide in a liquid state and desorb carbon dioxide again. Hereinabove, though one implementation has been described in detail by the examples and the experimental examples, the scope of one implementation is not limited to the specific examples, and should be construed by the appended claims.

What is claimed is:

1. A carbon dioxide absorbent comprising:

an ionic liquid comprising an imidazole-based anion and one or more cations, wherein the one or more cations are selected from the group consisting of

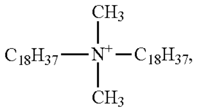,
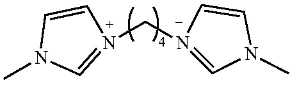,
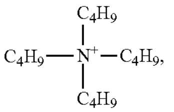,
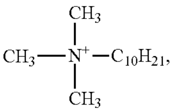,
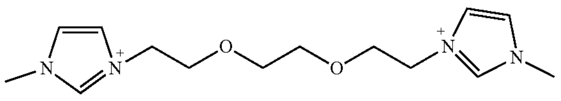,
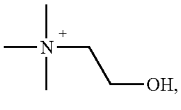,
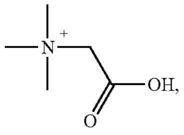, pyridinium, imidazolium, sulfonium, pyrrolidinium, piperidinium, pyrazolium, guanidinium, morpholinium, and derivatives thereof; and an aliphatic alcohol.

2. The carbon dioxide absorbent of claim 1, wherein the imidazole-based anion is a compound represented by the following Chemical Formula 1:

[Chemical Formula 1]

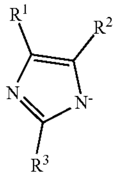

wherein $R^1$, $R^2$, and $R^3$ are independently of one another hydrogen, substituted or unsubstituted $C_{1-10}$ alkyl, substituted or unsubstituted $C_{1-10}$ alkylcarbonyl, substituted or unsubstituted $C_{1-10}$ alkoxy, substituted or unsubstituted $C_{3-8}$ cycloalkyl, substituted or unsubstituted 5-to 10-membered heterocycloalkyl containing one or more heteroatoms selected from the group consisting of N, O, and S, substituted or unsubstituted $C_{5-10}$ aryl, or substituted or unsubstituted 5-to 10-membered heteroaryl containing one or more heteroatoms selected from the group consisting of N, O, and S, or $R^1$ and $R^2$ are connected with a carbon atom to which $R^1$ and $R^2$ are bonded to form substituted or unsubstituted $C_{3-8}$ cycloalkyl, substituted or unsubstituted 5-to 10-membered heterocycloalkyl containing one or more heteroatoms selected from the group consisting of N, O, and S, substituted or unsubstituted $C_{5-10}$ aryl, or substituted or unsubstituted 5-to 10-membered heteroaryl containing one or more heteroatoms selected from the group consisting of N, O, and S, and the substitution is each substitution by one or more substituents selected from the group consisting of halo, oxo, cyano, amino, nitrile, $C_{1-10}$ alkyl, $C_{1-10}$ alkylcarbonyl, and $C_{1-10}$ alkoxy.

3. The carbon dioxide absorbent of claim 2, wherein $R^1$, $R^2$, and $R^3$ are independently of one another hydrogen, substituted or unsubstituted $C_{1-5}$ alkyl, substituted or unsubstituted $C_{1-5}$ alkylcarbonyl, or substituted or unsubstituted $C_{1-5}$ alkoxy, or $R^1$ and $R^2$ are connected with a carbon atom to which $R^1$ and $R^2$ are bonded to form substituted or unsubstituted $C_{5-8}$ cycloalkyl, substituted or unsubstituted 5-and 8-membered heterocycloalkyl containing one or more heteroatoms selected from the group consisting of N, O, and S, substituted or unsubstituted $C_{5-8}$ aryl, or substituted or unsubstituted 5-and 8-membered heteroaryl containing one or more heteroatoms selected from the group consisting of N, O, and S, and the substitution is each substitution by one or more substituents selected from the group consisting of halo, oxo, and $C_{1-5}$ alkyl.

4. The carbon dioxide absorbent of claim 1, wherein the aliphatic alcohol is an aliphatic monohydric alcohol or an aliphatic polyhydric alcohol.

5. The carbon dioxide absorbent of claim 1, wherein the aliphatic alcohol is a $C_{2-10}$ aliphatic alcohol.

6. The carbon dioxide absorbent of claim 1, wherein the aliphatic alcohol has a boiling point of 130° C. or higher.

7. The carbon dioxide absorbent of claim 1, wherein the aliphatic alcohol has a heat capacity of 4.0 KJ/kg° C. or less.

8. The carbon dioxide absorbent of claim 1, wherein a carbon dioxide absorption equivalent represented by the following Equation 1 is 0.7 or more:

Carbon dioxide absorption equivalent=(number of moles of absorbed carbon dioxide)/(number of moles of absorbent). [Equation 1]

9. A carbon dioxide supplying agent comprising: a compound formed by reacting the carbon dioxide absorbent according to claim 1 with carbon dioxide and an aliphatic carbonate.

10. The carbon dioxide supplying agent of claim 9, wherein the compound formed by reacting the absorbent with carbon dioxide is a compound represented by the following Chemical Formula 2:

[Chemical Formula 2]

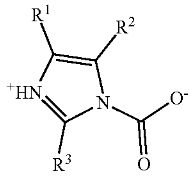

wherein $R^1$, $R^2$, and $R^3$ are independently of one another hydrogen, substituted or unsubstituted $C_{1-10}$ alkyl, substituted or unsubstituted $C_{1-10}$ alkylcarbonyl, substituted or unsubstituted $C_{1-10}$ alkoxy, substituted or unsubstituted $C_{3-8}$ cycloalkyl, substituted or unsubstituted 5-to 10-membered heterocycloalkyl comprising one or more heteroatoms selected from the group consisting of N, O, and S, substituted or unsubstituted $C_{5-10}$ aryl, or substituted or unsubstituted 5-to 10-membered heteroaryl comprising one or more heteroatoms selected from the group consisting of N, O, and S, or $R^1$ and $R^2$ are connected with a carbon atom to which $R^1$ and $R^2$ are bonded to form substituted or unsubstituted $C_{3-8}$ cycloalkyl, substituted or unsubstituted 5-to 10-membered heterocycloalkyl comprising one or more heteroatoms selected from the group consisting of N, O, and S, substituted or unsubstituted $C_{5-10}$ aryl, or substituted or unsubstituted 5-to 10-membered heteroaryl comprising one or more heteroatoms selected from the group consisting of N, O, and S, and the substitution is each substitution by one or more substituents selected from the group consisting of halo, oxo, cyano, amino, nitrile, $C_{1-10}$ alkyl, $C_{1-10}$ alkylcarbonyl, and $C_{1-10}$ alkoxy.

* * * * *